(12) United States Patent
Choi

(10) Patent No.: US 11,852,877 B2
(45) Date of Patent: Dec. 26, 2023

(54) CONNECTOR PLUG AND ACTIVE OPTICAL CABLE ASSEMBLY USING SAME

(71) Applicant: LIPAC CO., LTD., Seoul (KR)

(72) Inventor: Seong Wook Choi, Seoul (KR)

(73) Assignee: LIPAC CO., LTD., Seoul (KR)

(*) Notice: Subject to any disclaimer, the term of this patent is extended or adjusted under 35 U.S.C. 154(b) by 116 days.

(21) Appl. No.: 17/606,631

(22) PCT Filed: May 13, 2020

(86) PCT No.: PCT/KR2020/006276
§ 371 (c)(1),
(2) Date: Oct. 26, 2021

(87) PCT Pub. No.: WO2020/231171
PCT Pub. Date: Nov. 19, 2020

(65) Prior Publication Data
US 2022/0236500 A1      Jul. 28, 2022

(30) Foreign Application Priority Data
May 13, 2019   (KR) .................. 10-2019-0055767

(51) Int. Cl.
*G02B 6/42*    (2006.01)

(52) U.S. Cl.
CPC .......... *G02B 6/4215* (2013.01); *G02B 6/4228* (2013.01)

(58) Field of Classification Search
CPC ....... G02B 6/42; G02B 6/4215; G02B 6/4228
See application file for complete search history.

(56) References Cited

U.S. PATENT DOCUMENTS

| | | | |
|---|---|---|---|
| 2002/0126356 A1* | 9/2002 | Nakanishi | G02B 6/4255 398/164 |
| 2005/0111797 A1 | 5/2005 | Sherrer et al. | |

(Continued)

FOREIGN PATENT DOCUMENTS

| | | |
|---|---|---|
| JP | 2015084021 | 4/2015 |
| KR | 20000065884 | 11/2000 |

(Continued)

OTHER PUBLICATIONS

International Search Report—PCT/KR2020/006276 dated Aug. 13, 2020.

*Primary Examiner* — Tina M Wong
(74) *Attorney, Agent, or Firm* — CANTOR COLBURN LLP

(57) ABSTRACT

Provided is a connector plug includes: an optical device module having an optical engine that generates an optical signal or receives an optical signal; an optical fiber alignment guide member having an optical fiber insertion channel formed on one surface of the optical device module so that optical fibers are seated; and an optical component that is seated in an optical component alignment guide groove formed adjacent to the optical fiber alignment guide member on one surface of the optical device module, wherein the optical engine includes an optical device which is formed adjacent to the optical component on one surface of the optical device module, and which radiates an optical signal or receives an optical signal in the horizontal direction, and an optical integrated circuit (IC) installed in the optical device module and controlling the optical device.

9 Claims, 13 Drawing Sheets

(56) References Cited

U.S. PATENT DOCUMENTS

2012/0319304 A1* 12/2012 Pressel .................... H01L 25/16
 438/107
2015/0286008 A1* 10/2015 Shimizu ................. G02B 6/124
 385/37

FOREIGN PATENT DOCUMENTS

| KR | 100816062 | 3/2008 |
|----|-----------|--------|
| KR | 20140059869 | 5/2014 |
| KR | 20180097888 | 9/2018 |

* cited by examiner

CONNECTOR PLUG AND ACTIVE OPTICAL CABLE ASSEMBLY USING SAME

TECHNICAL FIELD

The present invention relates to a connector plug and, more specifically, to a connector plug and an active optical cable (AOC) assembly using the same, in which an optical fiber and an optical component can be aligned and assembled with an optical device by using an optical fiber alignment guide member and an optical component alignment guide groove which are formed on one surface of an optical device module, to thereby easily perform passive alignment of the optical device and the optical component.

BACKGROUND ART

An optical engine is typically used to transmit data at high speed. The optical engine includes hardware units for converting an electrical signal to an optical signal, transmitting the optical signal, receiving the optical signal, and converting the optical signal back into an electrical signal. An electrical signal is converted to an optical signal when the electrical signal is used to be modulated in a light source device such as a laser unit. Light from a light source is coupled to a transmission medium such as an optical fiber. After passing through an optical network and reaching its destination through various optical transmission media, the light is coupled to a receiving device such as a detector. The detector generates an electrical signal based on the received optical signal for use by a digital processing circuit.

Optical communication systems are often used to transmit data in various systems, such as electrical telecommunication systems and data communication systems. The electrical telecommunication systems often involve the transmission of data over a wide geographical distance ranging from a few miles to thousands of miles. The data communication systems often involve the transmission of data through a data center. Such systems include the transmission of data over distances ranging from a few meters to hundreds of meters. A coupling component that is used to transmit an electrical signal as an optical signal and that transfers the optical signal to an optical transmission medium such as an optical cable is relatively expensive. Because of this cost, optical transmission systems are typically used as the backbone of a network that transmits large amounts of data over long distances.

Meanwhile, current computer platform architecture designs can encompass several different interfaces to connect one device to another. These interfaces provide input/output (I/O) to computing devices and peripheral devices, and can use a variety of protocols and standards to provide I/O. Different interfaces may use different hardware structures to provide interfaces. For example, current computer systems typically have multiple ports with corresponding connection interfaces, which are implemented by physical connectors and plugs at the ends of the cables connecting the devices.

A universal connector type may be provided with a universal serial bus (USB) subsystem having multiple associated USB plug interfaces, DisplayPort, High Definition Multimedia Interface (HDMI), Firewire (as defined in IEEE 1394), or other connector types.

In addition, for transmission of very large-capacity data at a very high speed between two separate devices such as a UHD television (TV) using a set-top box, an electrical and optical input/output interface connector is required.

Furthermore, when a large amount of data needs to be transmitted and received between a board and another board in a UHD television, a miniaturized and slimmed optical interface connector with a thickness of 1 mm is required.

That is, in order to achieve high-speed transmission while satisfying a thin form factor in a TV or the like, the size of an active optical cable (AOC) connector or the size of an optical engine embedded in the AOC should be as thin as one mm or less. However, since the conventional AOC is packaged on a printed circuit board (PCB) in a bonding or Chip On Board (COB) form, it is difficult to realize a thin thickness.

AOC, which meets these requirements, is now being offered at a high price, but since such a high price is dominated by additional active alignment costs due to the inaccurate alignment between PCBs, optical devices (photodiode (PD)/vertical-cavity surface-emitting laser (VCSEL) devices), optical components (lenses or mirrors), or optical fibers, it requires a lot of costs to construct and assemble an accurate structure for passive alignment.

In addition, it is required to solve the performance degradation caused by wire-bonding of optical devices (PD/VCSEL) for high-speed interconnection of several tens giga to 100 giga or more.

Korean Patent Application Publication No. 10-2014-0059869 (Patent Document 1) discloses an input/output (I/O) device comprising: an I/O connector including both electric and optical I/O interfaces, wherein the optical I/O interface includes at least one optical lens; at least one optical fiber a first end of which is terminated at the I/O connector and optically coupled to the at least one optical lens; and a transceiver module that converts optical signals to electrical signals and includes at least one lens wherein a second end of the at least one optical fiber is terminated at the transceiver module and wherein the I/O connector and the transceiver module are not in contact with each other.

In the I/O device of Patent Document 1, since optical devices such as an optical engine and driving chips are assembled by using a printed circuit board, automation for achieving high accuracy and productivity is difficult, and miniaturization and slimness are difficult.

Generally, an optical communication module should include: a mechanical device capable of fixing an optical cable for transmitting an optical signal; an optical device for converting an optical signal transmitted via the optical cable into an electrical signal or converting an optical signal for transmission via the optical cable from an electrical signal; and an interface circuit for transmitting and receiving information with respect to the optical device.

In a conventional optical communication module, since an optical cable fixing member, an optical device, and interface circuit chips should be arranged while being spaced apart from each other on a circuit board through separate processes, an area occupying the circuit board is increased, and a manufacturing process is complicated. In addition, since the electrical signal provided by the optical element is provided to an optoelectronic circuit through a conductive strip formed on the circuit board, the electrical signal may be deteriorated.

DISCLOSURE

Technical Problem

The present invention is devised to solve the above problems, and it is an object of the present invention to provide a connector plug and an active optical cable (AOC)

assembly using the same, in which an optical fiber and an optical component can be aligned and assembled with an optical device by using an optical fiber alignment guide member and an optical component alignment guide groove which are formed on one surface of an optical device module, to thereby easily perform passive alignment of the optical device and the optical component.

It is another object of the present invention to provide a connector plug having a simple structure in which an assembly of an optical device module, an optical fiber, and an optical component may be coupled to a minimum number of components through an assembly process, and an active optical cable (AOC) assembly using the same.

It is still another object of the present invention to provide a connector plug and an active optical cable (AOC) assembly using the same, wherein, although individual optical components are used by integrally forming an optical fiber assembly channel having an open structure on one surface of an optical device module by using an optical fiber alignment guide member, and assembling an optical fiber, alignment between an optical device and an optical component and alignment between the optical component and the optical fiber can have a high accuracy without misalignment by using a passive alignment technique.

It is another object of the present invention to provide a connector plug and an active optical cable (AOC) assembly using the same in which an optical fiber assembly channel having an open structure is integrally formed in an optical device module in the form of a system-in-package (SIP) type to package an optical engine into a one-chip or a single device.

It is still another object of the present invention to provide an active optical cable (AOC) assembly capable of transmitting and receiving a large amount of data at an ultra-high speed and implementing a miniaturized and slimmed structure with a thickness of one mm while being manufactured at low cost.

It is still another object of the present invention to provide a connector plug and an active optical cable (AOC) assembly using the same, which solves a problem that an alignment accuracy is deteriorated when a chip is drifted out of an intended position in a molding process, in the case of using an optical device module in the form of a system-in-package (SIP) type, and uses an edge emitting laser diode in which light is radiated in a lateral direction, not a vertical direction, in an optical device.

Technical Solution

A connector plug according to an embodiment of the present invention includes: an optical device module having an optical engine that generates an optical signal or receives an optical signal; an optical fiber alignment guide member which is formed on one surface of the optical device module and has an optical fiber insertion channel so that an optical fiber is seated; and an optical component that is seated in an optical component alignment guide groove formed adjacent to the optical fiber alignment guide member on one surface of the optical device module, wherein the optical engine includes an optical device which is formed adjacent to the optical component on one surface of the optical device module, and which radiates an optical signal or receives an optical signal in the horizontal direction, and an optical integrated circuit (IC) installed in the optical device module and controlling the optical device.

The connector plug further includes a wiring layer formed on one surface of the optical device module and having first and second vertical conductive path members to connect the optical integrated circuit (IC) and the optical device, wherein the optical fiber alignment guide member and the optical component alignment guide groove may be formed on an upper portion of the wiring layer.

The optical device includes a first connection pad formed on an upper surface thereof, which may be connected to the first vertical conductive path member by a bonding wire, and a second connection pad formed on a lower surface of the optical device, which may be directly connected to the second vertical conductive path member. In addition, the optical device may include first and second connection pads formed on lower surface thereof, which are directly connected to the first and second vertical conductive path members.

According to the connector plug of the present invention, the wiring layer further includes a wiring pattern for withdrawing an output terminal of the optical integrated circuit (IC) to the outside, wherein the wiring pattern may be connected to one of the optical component and an external connection terminal formed on the other surface of the optical device module.

The optical component may include an Arrayed Waveguide Grating (AWG) for processing an optical signal generated from the optical device or changing an optical path, wherein the AWG may multiplex the light of different wavelengths generated by a plurality of optical devices when the optical signals are transmitted from the optical devices, and may demultiplex the optical signals when receiving the optical signals.

The AWG includes: a core made of a high refractive index material; and a cladding surrounding the core and made of a low refractive index material, wherein total internal reflection may be performed at the interface between the core and the cladding.

In addition, the connector plug of the present invention may further include a lens arranged between the optical device and the optical component to control a path of the optical signal generated from the optical device and focus the optical signal on the core of the optical component.

A connector plug, according to another embodiment of the present invention, comprises: an optical device which radiates an optical signal or receives an optical signal, in the horizontal direction; an optical integrated circuit (IC) for controlling the optical device; an optical device module on which the optical device and the optical integrated circuit are mounted; an optical fiber alignment guide member formed on one surface of the optical device module and having an optical fiber insertion channel on which an optical fiber is mounted; an optical component seated on an optical component alignment guide groove formed adjacent to the optical fiber alignment guide member on one surface of the optical device module; and a conductive path installed in the optical device module to electrically connect the optical integrated circuit (IC) and the optical device.

In addition, the optical component may include an Arrayed Waveguide Grating (AWG) for processing an optical signal generated from the optical device or changing an optical path, wherein the AWG may multiplex the light of different wavelengths generated by a plurality of optical devices when the optical signals are transmitted from the optical devices, and may demultiplex the optical signals when receiving the optical signals.

Advantageous Effects

In general, an active optical cable (AOC) connector capable of high-speed transmission of tens giga to one hundred (100) giga or more is required to be a compact optical interface connector slimmed with a thickness of one (1) mm, and misalignment should not occur while using passive alignment between PCBs, optical devices (PDs/VCSELs), optical components (lenses or mirrors), and optical fibers to meet reasonable manufacturing costs.

In the present invention, in order to assemble an optical fiber and an optical component, a precise guide structure, which is integrally formed on one surface of a package, serves as an optical bench, and thus the assembly can have high accuracy without misalignment.

Further, in the present invention, an optical device and a driving chip are packaged without using a substrate in a Fan Out Wafer Level Package (FOWLP) manner using a semiconductor manufacturing process, so that an optical device module can be realized in ultra-compact size of 1/16 or so of the conventional art.

In addition, in the present invention, an optical fiber assembly channel having an open structure is integrally formed in an optical device module in the form of a system-in-package (SIP) type, so that an optical engine can be packaged into a single chip or a single device.

In the present invention, an optical fiber assembly channel of a pick-and-place type package may have a structure capable of automating an optical fiber assembly.

In addition, the present invention can provide an active optical cable (AOC) assembly (such as an optical interface connector) capable of transmitting and receiving a large amount of data at a very high speed and being slimmed with a thickness of 1 mm.

In the present invention, a physically detachable coupling can be provided to a mating port of a terminal, and electrical I/O interfacing or optical interfacing can be performed through an interface provided at the mating port.

In addition, in the present invention, an external connection terminal made of a solder ball is provided and ultra-high-speed and high-capacity data transfer can be performed between a PCB and another PCB, between a chip and another chip, between a PCB and a chip, and between a PCB and a peripheral device.

A connector plug according to the present invention can be packaged in a form of a system-in-package (SiP), a system-on-chip (SoC), a system-on-board (SoB), and a package-on-package (PoP), as a transponder chip having both an electro-optic conversion function and a photo-electric conversion function.

In addition, in the present invention, an active optical cable (AOC) can implement an external connection terminal to meet the data transmission standard specification such as a mini display port, a standard display port, a mini universal serial bus (USB), a standard USB, a PCI Express (PCIe), IEEE 1394 Firewire, Thunderbolt, lightning, high-definition multimedia interface (HDMI), QSEP, SFP, CFP, or the like.

The present invention solves a problem that an alignment accuracy is deteriorated when a chip is drifted out of an intended position in a molding process, in the case of using an optical device module in the form of a system-in-package (SIP) type, and may use an edge emitting laser diode in which light is radiated in a lateral direction, not a vertical direction, in an optical device.

BEST MODE

Figure 1:
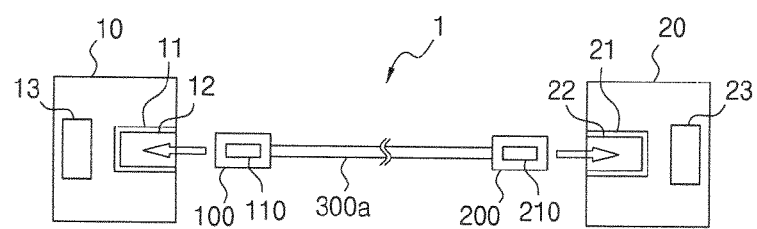
FIG. 1 is a schematic block diagram illustrating an optical communication system constructed using an active optical cable (AOC) assembly according to the present invention.

Hereinafter, embodiments of the present invention will be described in detail with reference to the accompanying drawings. The sizes and shapes of the components shown in the drawings may be exaggerated for clarity and convenience.

Due to the price of devices that convert electrical signals to optical signals and vice versa, optical communication systems are typically used as backbones in networks. However, optical communication systems can provide various advantages in computer communications. Computer communications refers to communications ranging from a few centimeters to hundreds of centimeters.

The present invention provides systems applicable to computer communications as well as an optical communication system used for optical communication between a terminal and another terminal which are located at a long distance from each other.

The optical system may use a semiconductor package that connects an optical fiber to an optical engine. An optoelectronic device is a light emitting device or a light receiving device. An example of a light emitting device is a distributed feedback laser (DFB). An example of a light receiving device is a photodiode (PD).

A driving circuit (i.e., a driving chip or optical IC) is used to operate according to an optical element. For example, a photodiode operates with a trans-impedance amplifier to amplify an electrical signal due to a collision of photons on the photodiode. When the optoelectronic device is a light emitting device, the drive circuit is used to drive the light emitting device.

In the present invention, a slim optical device module can be implemented by packaging an optical device and a driving chip by using a fan-out technology of withdrawing input/output (I/O) terminals thereby increasing I/O terminals, that is, a Fan Out Wafer Level Package (FOWLP) technology, when a driving circuit (such as a driving chip) operating according to an optoelectronic element is integrated without wire-bonding using a flip chip package technology together with the optoelectronic device, while devices are integrated without using a substrate.

In addition, various alignment techniques are used to align optoelectronic devices (such as optical devices) with optical fibers assembled in an embedded semiconductor package (optical device module). The optical device module undergoes a manufacturing process using a semiconductor process in units of wafers. Subsequently, an optical fiber alignment guide member and an optical component alignment guide for respectively mounting the optical fiber and the optical component are integrally formed on one surface of the optical device module. Then, the optical device and the optical component are fixed by pick-and-place, and an optical connector plug capable of fixing the optical fiber and the optical component by a dicing process individually separating the optical device and the optical component is obtained in a semiconductor package type.

Moreover, an optical component alignment guide member and an optical component alignment guide required for assembling an optical device and an optical component are integrally formed on an optical device module wafer. By assembling the optical device and the optical component, the alignment between the optical device and the optical component and the alignment between the optical component and the optical fiber can be made without misalignment even if an inexpensive passive alignment technology is used without using the active alignment.

In the following detailed description, an optical engine can refer to an optical device provided therein, and an optical fiber can refer to an optical fiber line in which a coating layer is removed from the optical fiber.

FIG. 1 is a schematic block diagram illustrating an optical communication system constructed using an active optical cable (AOC) assembly according to the present invention.

The optical communication system 1 enables optical communication by interconnecting first and second terminals 10 and 20 to have first and second connector plugs 100 and 200 at respective ends. An optical cable 300a having optical fibers therein is connected between the second connector plugs 100 and 200.

Here, the first and second terminals 10 and 20 may each be one of a desktop or laptop computer, a notebook, an Ultrabook, a tablet, a netbook, or a number of computing devices not included therein.

In addition to computing devices, the first and second terminals 10 and 20 may include many other types of electronic devices. Other types of electronic devices may include, for example, smartphones, media devices, personal digital assistants (PDAs), ultra mobile personal computers, multimedia devices, memory devices, cameras, voice recorders, I/O devices, a server, a set-top box, a printer, a scanner, a monitor, an entertainment control unit, a portable music player, a digital video recorder, a networking device, a game machine, and a gaming console.

The first and second terminals 10 and 20 are connected to each other through the optical communication system according to the present invention and first and second mating ports 12 and 22 which are physically coupled to the first and second connector plugs 100 and 200 so as to be capable of performing interfacing are installed, in numbers of at least one, in housings 11 and 21 which are provided in the first and second terminals 10 and 20, respectively.

The first and second connector plugs 100 and 200 may support communications via an optical interface. In addition, the first and second connector plugs 100 and 200 may support communications via an electrical interface.

In some exemplary embodiments, the first terminal 10 may include a first server having a plurality of processors, and the second terminal 20 may include a second server having a plurality of processors.

In these embodiments, the first server may be interconnected with the second server by means of the connector plug 100 and the mating port 12. In another embodiment, the first terminal 10 may include a set-top box, the second terminal 20 may include a television (TV), and vice versa. Also, the first and second connector plugs 100 and 200 and the first and second mating ports 12 and 22 described herein may be one of a number of embodiments.

Also, the second terminal 20 may be a peripheral I/O device.

The first and second connector plugs 100 and 200 may be configured to engage with the first and second mating ports 12 and 22 of the first and second terminals 10 and 20, respectively.

The first and second mating ports 12 and 22 may also have one or more optical interface components. In this case, the first mating port 12 may be coupled to an I/O device and may include processing and/or terminal components for transferring optical signals (or optical and electrical signals) between a processor 13 and the port 12. The signal transfer may include generation and conversion to or reception of optical signals and conversion to electrical signals.

The processors 13 and 23 provided in the first and second terminals 10 and 20 may process electrical and/or optical I/O signals, and one or more of the processors 13 and 23 may be used. The processors 13 and 23 may be a microprocessor, a programmable logic device or array, a microcontroller, a signal processor, or a combination comprising some or all of these.

The first and second connector plugs 100 and 200 may include first and second optical engines 110 and 210 in the connector plugs and the first and second connector plugs 100 and 200 may be referred to as active optical connectors or active optical receptacles and active optical plugs.

Generally, such an active optical connector can be configured to provide a physical connection interface to the mating connector and optical assembly. The optical assembly may also be referred to as a "sub-assembly." The assembly may refer to a finished product or a completed system or subsystem of an article of manufacture, but the sub-assembly may generally be combined with other components or other subassemblies to complete the sub-assembly. However, subassemblies are not distinguished from "assemblies," herein, and references to assemblies can be referred to as subassemblies.

The first and second optical engines 110 and 210 may include any devices configured to generate and/or receive and process an optical signal according to various tasks.

In an embodiment, the first and second optical engines 110 and 210 may include at least one of a laser diode for generating an optical signal, an optical integrated circuit (IC) for controlling the optical interfacing of the first and second connector plugs 100 and 200, and a photodiode for receiving an optical signal. In some embodiments, the optical IC may be configured to control the laser diode and the photodiode, drive the laser diode, and/or amplify the optical signal from the photodiode. In particular, in the present invention, the laser diode includes an edge light emitting laser diode in which light is emitted in a lateral direction rather than a vertical direction.

In one embodiment, the first and second optical engines 110 and 210 may be configured to process optical signals according to one or more communication protocols or in correspondence thereto. In embodiments where the first and second connector plugs 100 and 200 are configured to transmit optical and electrical signals, optical and electrical interfaces may be required to operate in accordance with the same protocol.

Depending on whether the first and second optical engines 110 and 210 process signals in accordance with the protocol of the electrical I/O interface, or process signals in accordance with another protocol or standard, the first and second optical engines 110 and 210 may be configured or programmed for the intended protocol in a particular connector, or various optical engines may be configured for the various protocols.

In one embodiment, a photodiode, or a component having a photodiode circuit, can be considered as a photonic terminal component because the photodiode converts an optical signal into an electrical signal. The laser diode may be configured to convert an electrical signal to an optical signal. The optical IC may be configured to drive the laser diode based on a signal to be optically transmitted by driving the laser diode to an appropriate voltage to generate an output for generating the optical signal. The optical IC may be configured to amplify the signal from the photodiode. The optical IC may be configured to receive, interpret, and process an electrical signal generated by the photodiode.

In an embodiment of the present invention, an I/O complex (not shown) may be provided to transmit an optical signal (or an optical signal and an electrical signal) between processors 13 and 23 and mating ports 12 and 22. The I/O complex can accommodate at least one I/O wiring which is constructed to control at least one I/O link which allows the processor 13 and 23 to communicate with the first and second terminals 10 and 20 via the first and second optical engines 110 and 210 of the first and second connector plugs 100 and 200. The I/O wiring may be configured to provide the ability to transmit one or more types of data packets of a communication protocol.

Various communication protocols or standards may be used in embodiments of the present invention. The communications protocols meet the data transmission standard such as a mini display port, a standard display port, a mini universal serial bus (USB), a standard USB, a PCI Express (PCIe), an IEEE 1394 Firewire, a Thunderbolt, a lightning, and a High Definition Multimedia Interface (HDMI), but the present invention is not limited thereto.

Each different standard may have a different configuration or a pin arrangement (pin out) for an electrical contact assembly. In addition, the size, shape and configuration of the connector may be subject to a standard that includes tolerances for mating of the mating connectors. Thus, the layout of connectors for integrating optical I/O assemblies may differ in various standards.

Physically detachable coupling may be made between the first and second connector plugs 100 and 200 and the mating ports 12 and 22 of the first and second terminals 10 and 20, and electrical I/O interfacing or optical interfacing may be accomplished via an interface provided at the mating ports 12 and 22.

In addition, in another embodiment described later, the first and second connector plugs 100 and 200 are not physically detachably coupled with the mating ports 12 and 22, but an external connection terminal made of a solder ball may be fixedly coupled to the main board including the processors 13 and 23. As a result, as shown in FIG. 1, the active optical cable (AOC) assembly of the present invention, in which the first and second connector plugs 100 and 200 are connected to both ends of the optical cable 300a, can be applied when the high-speed and large-capacity data transmission is needed by interconnecting each other, for example, between a PCB and another PCB, between a chip and another chip, between a chip and a PCB, between a board and a peripheral device, and between a terminal body and a peripheral I/O device.

In the optical communication system 1 according to an embodiment of the present invention, when the optical communication is performed between the first and second terminals 10 and 20, the first and second connector plugs 100 and 200 provided at respective ends can be configured in the same manner. Accordingly, the first connector plug 100, that is, the active optical cable (AOC) assembly, to be coupled with the first terminal 100 will be described in detail below.

Figure 2A:
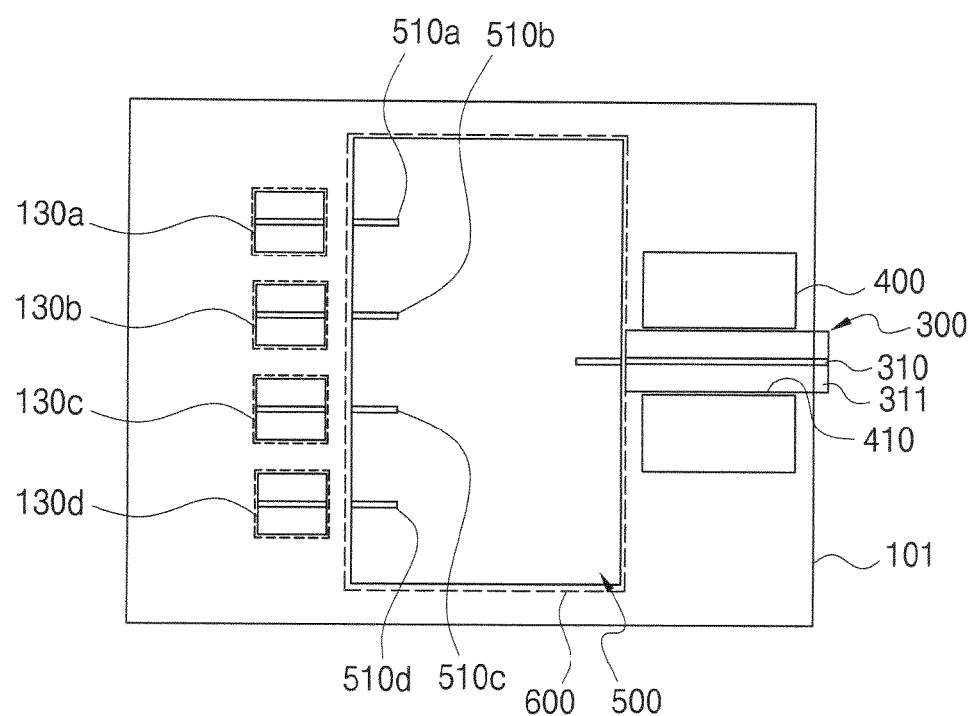
FIGS. 2A through 2C are a plan view, a cross-sectional view, and a side view, respectively, showing a connector plug in which an optical device, an optical component, and an optical fiber are mounted on one surface of an optical device module according to a first embodiment of the present invention.
Figure 2B:
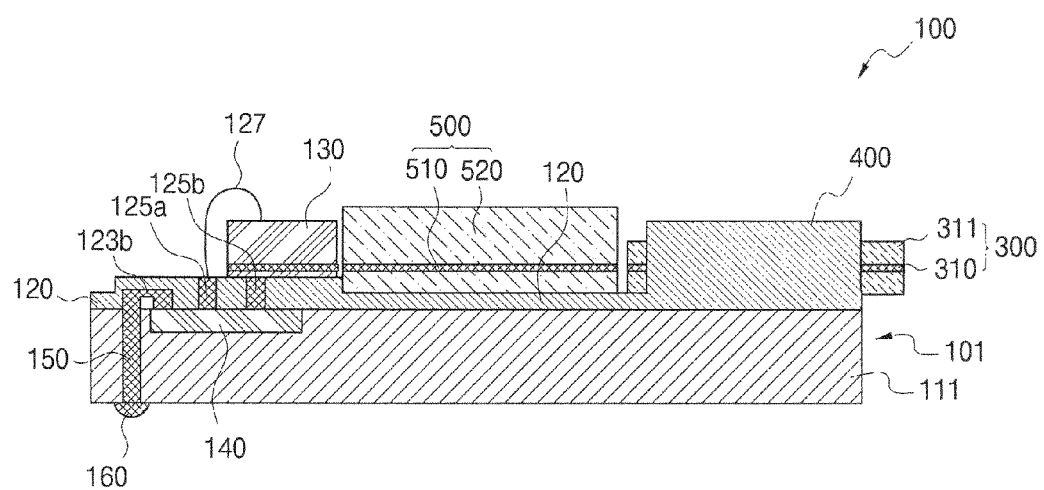
Figure 2C:
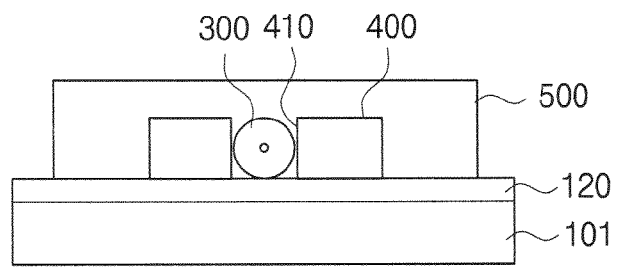

FIGS. 2A through 2C are a plan view, a cross-sectional view, and a side view, respectively, showing a connector plug in which an optical device, an optical component, and an optical fiber are mounted on one surface of an optical device module according to a first embodiment of the present invention.

Referring to FIGS. 2A to 2C, a connector plug 100 according to a first embodiment of the present invention comprises: an optical device module (package) 101 having an optical IC 140 for driving an optical device 130 therein; the optical device (light emission or light reception) provided on one surface of the optical device module 101; an optical component 500 installed on one surface of the optical device module 101 to process a signal generated from the optical device 130 or change an optical path; an optical fiber alignment guide member 400 which is installed on one surface of the optical device module 101 and has an optical fiber insertion channel on which a plurality of optical fibers 300 are mounted; and conductive path members 125a, 125b, and 127 formed on one surface of the optical device module 101 to electrically connect an internal device and the optical device 130.

The connector plug according to the first embodiment of the present invention shown in FIGS. 2A to 2C includes the optical fiber alignment guide member 400 and the optical component alignment guide groove 600 which are integrally formed to align and mount the optical fiber 300 and the optical component 500, respectively, on one surface of the optical device module 101.

The optical device module 101 may include the active optical engine 110 configured to actively generate and/or receive and process optical signals. The optical engine 110 may include an optical device 130 for generating an optical signal or receiving an optical signal, and an optical IC 140 for controlling an optical interface by controlling the optical device 130.

In this case, the optical device 130 is integrated on one surface of the optical device module 101 in a mounting manner, and the optical IC 140 is partially molded inside the optical device module 101.

In addition, the optical device module 101 may further include a processor (not shown), an encoder and/or a decoder 135, a passive device such as R, L, and C, or a power related IC chip, which are required for signal processing in addition to the optical IC 140 as necessary.

The optical device 130 may include, for example, a laser diode for generating an optical signal and/or a photodiode for receiving an optical signal. In another embodiment, the optical IC 140 may be configured to control the laser diode and the photodiode.

In this case, the optical device 130 may be integrated on one surface of the optical device module 101 in a mounting manner, and may use an edge emitting laser diode in which light is emitted in a lateral direction rather than a vertical direction.

Furthermore, the optical device 130 may use a distributed feedback (DFB) laser having a resonator having a wavelength selectivity by allowing the optical waveguide to have a periodic structure. The DFB laser has the same light emitting principle as a normal semiconductor laser, but an uneven portion is installed in the light emitting portion, in order to equally make the wavelength of the light. As a result, the speed of the light transmitted through the optical fiber is also equal, so that the signal waveform does not collapse.

In another embodiment, the optical IC 140 may be configured to drive the laser diode and amplify an optical signal from the photodiode.

The optical device module 101 does not use a substrate, but integrates various components, for example, the optical IC 140 and the like, in the form of a flip chip, for example, and is molded by using an epoxy mold compound (EMC) to form a mold body 111. As a result, the mold body 111 serves to safely protect the optical engine 110, which is packaged after being integrated, from impact.

Figure 12A:
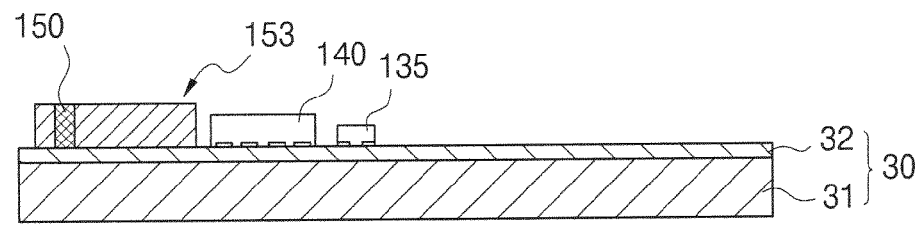
FIGS. 12A through 12H are cross-sectional views of processes for illustrating a method of fabricating an optical device module of a connector plug according to the first embodiment of the present invention in an Fan Out Wafer Level package (FOWLP) method.
Figure 12B:
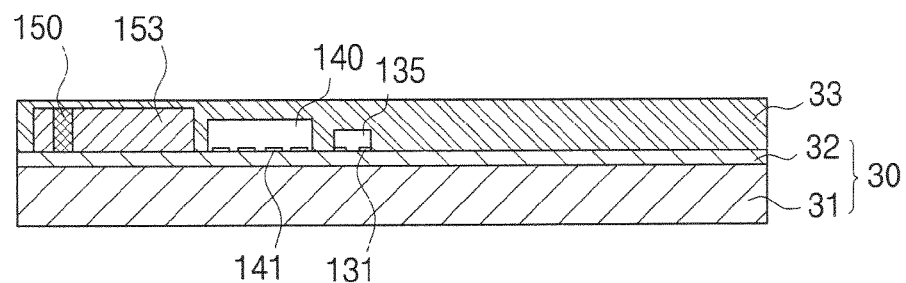
Figure 12C:
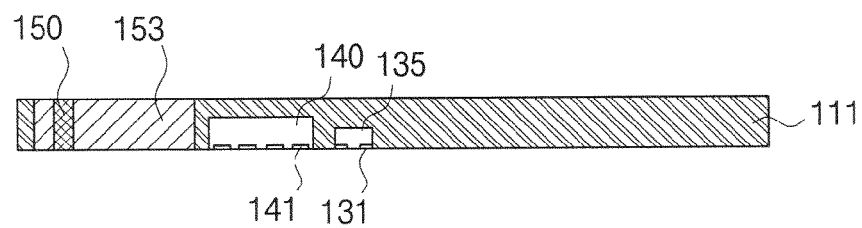
Figure 12D:
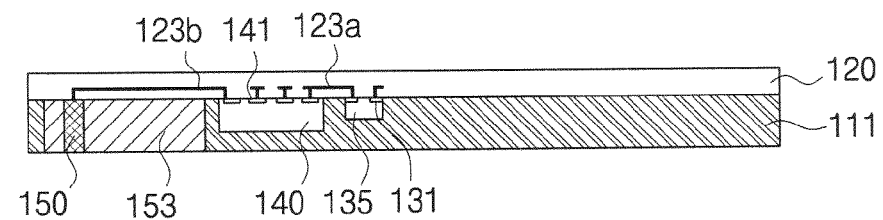

As shown in FIG. 12D, in the optical device module 101, a conductive vertical via 150 that is used for electrical interconnection with the external connection terminal 160 arranged on an outer surface of the optical element module 101, is arranged in the vertical direction with respect to the mold body 111.

In addition, the optical device module 101 may further include various components constituting the optical engine 110, for example, an optical IC 140, a processor (not shown), an encoder and/or a decoder 135, a passive element such as R, L, C, or the like, or a power-related IC chip.

On top of the optical device module 101 are formed the vertical conductive path members 125a and 125b protecting the optical IC 140 and the connection pads 131 and 141 of the internal devices such as a processor (not shown), an encoder, and/or a decoder 135 and electrically connecting the internal device 130 to the optical device 130 exposed to the outside, and a wiring layer 120 for protecting a conductive wiring pattern 123a for interconnection between the encoder and/or decoder 135 and the optical IC 140, and a conductive wiring pattern 123b interconnecting the optical IC 140 with the conductive vertical via 150 to each other.

In this case, the optical device 130 according to the first embodiment uses a chip having a structure in which two connection pads including an anode and a cathode are formed on the upper and lower surfaces of the optical device 130, respectively, and light enters and exits from the side surfaces. That is, the direction in which the light of the optical device 130 enters and exits is set in a direction opposite to the optical component 500 and the optical fiber 300.

In the case of the optical device 130 of the first embodiment in which two connection pads composed of an anode and a cathode are formed on an upper surface and a lower surface of the optical device 130, respectively, a connection pad (not shown) formed on the upper surface of the optical device 130 is connected to the vertical conductive path member 125a, by a bonding wire 127, and a connection pad (not shown) formed on the lower surface of the optical device 130 is directly connected to the vertical conductive path member 125b by using a solder ball or the like.

In the case of the optical device 130 according to the first embodiment, two connection pads composed of an anode and a cathode are formed on an upper surface and a lower surface of the optical device 130, respectively, but are not limited thereto, for example, both of two connection pads composed of an anode and a cathode may be formed on the lower surface of the optical device 130. Embodiments thereof will be described later.

The wiring layer 120 is provided with a conductive wiring pattern 123a for interconnecting the connection pads 131 and 141 arranged on the lower surfaces of the encoder and/or decoder 135 and the optical IC 140, and a conductive wiring pattern 123b interconnecting the optical IC 140 and the conductive vertical via 150 in which the conductive wiring pattern 123a and the conductive wiring pattern 123b are buried in the wiring layer 120. As a result, packaging can be achieved without wire-bonding.

The wiring layer 120 is made of the same material as a dielectric layer or a passivation layer, for example, polyimide, poly (methyl methacrylate) (PMMA), benzocyclobutene (BCB), silicon oxide ($SiO_2$), acrylic, or other polymer-based insulating materials. In addition, the wiring layer 120 may be made of a transparent material as necessary.

The optical component 500 is installed in an optical component alignment guide groove 600 formed on one surface of the optical device module 101 to process an optical signal generated from the optical device 130 or to change an optical path, and may be implemented as an arrayed waveguide grating (AWG) which performs an optical multiplexer (MUX) or demultiplexer (DEMUX) function.

The arrayed waveguide grating (AWG) transmits optical signals in both directions, acts as an optical multiplexer (MUX) when the optical device 130 transmits optical signals, and functions as a demultiplexer (DEMUX) when the optical device 130 receives optical signals.

In addition, the optical component 500 may be implemented as a modulator including Mach Zehnder, Ring, Thermal, etc.

To this end, the arrayed waveguide grating (AWG) may be formed by patterning cores 510a-510d formed of a high refractive index polymer between lower and upper cladding layers 420, in correspondence to the optical devices 130a-130d.

In addition, the optical component 500 may include an optical attenuator or the like.

When the optical device 130 includes four channels using four edge light emitting lasers, the optical component 500, that is, an AWG, is formed in four channels having four cores 510a to 510d corresponding thereto, and the four optical signals passing through the AWG are multiplexed to be transmitted through one optical fiber 300.

The light beams having different wavelengths from the four optical devices 130 are optically multiplexed in the arrayed waveguide grating (AWG) to be synthesized as one.

An optical fiber alignment guide member 400 is installed on one surface of the optical device module 101 and has an optical fiber insertion channel 410 through which the optical fiber 300 is mounted.

The optical fiber alignment guide member 400 serves as an alignment guide pattern for matching the core 310 of the optical fiber 300 and the core 520 of the optical component 500.

The optical fiber alignment guide member 400 may be formed in wafer units on the surface of the optical device module 101 by photolithography using a polymer material.

The optical fiber 300 has a cladding 311 formed on the outer circumference of the core 310, and the optical component 500, that is, the AWG, includes a plurality of cores 510-510d and a cladding 520 surrounding the cores. When the core 510 has a structure of using a high refractive index material, and the cladding 520 has a structure in which a low refractive index material is arranged therein, total internal reflection is performed at the interface between the core 510 and the cladding 520, so that light travels through the core 510.

Hereinafter, a method of manufacturing the optical device module 101 according to the present invention will be described with reference to FIGS. 12A to 12H.

First, as shown in FIG. 12A, various chip-shaped components to be integrated into the optical device module 101 are attached to a predetermined position of a molding tape 30 in a flip chip process using the molding tape 30 having an adhesive layer (or a release tape) 32 formed on one surface of a molding frame 31.

Figure 12E:
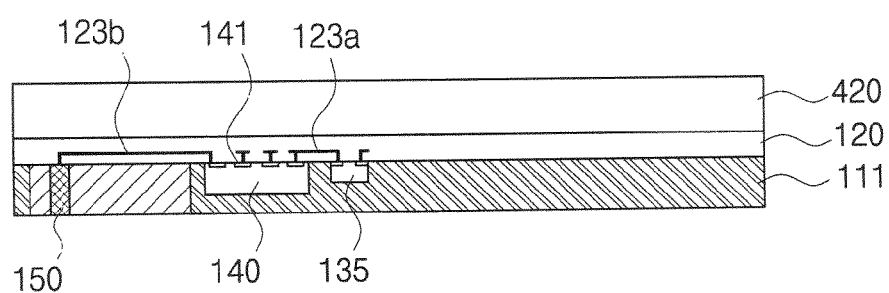
Figure 12F:
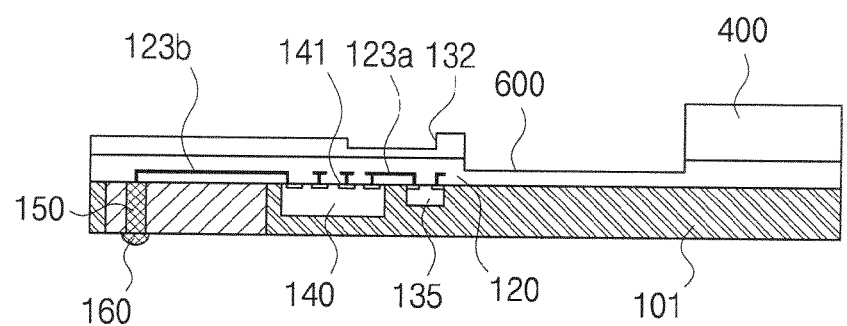
Figure 12G:
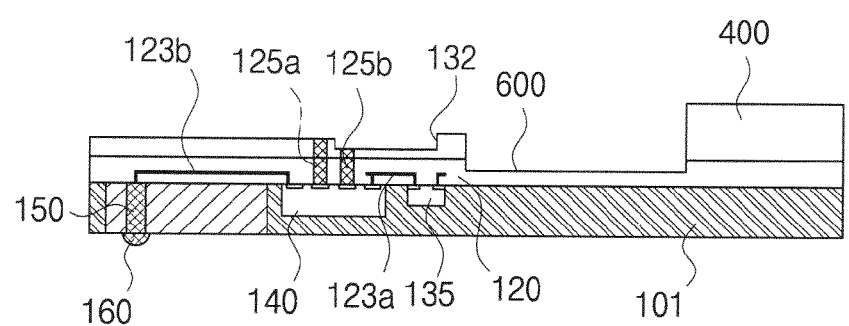

In this case, the molding tape 30 may be formed in a wafer shape so that the manufacturing process can be performed in a wafer level, as shown in FIG. 12G.

Various components to be integrated in the optical device module 101 are the encoder and/or decoder 135, the optical IC 140, and a via PCB 153 required to form the conductive vertical via 150, and are mounted in a pick-and-place manner. In this case, the processor may include a processor, a passive element such as R, L, C, etc. required for signal processing, or a power-related IC chip as necessary. The component to be mounted determines the mounting direction so that the connection pads of the chip are in contact with the molding tape 30.

The via PCB 153 may form a through hole by penetrating a PCB with a laser or by using a patterning process and an etching process on the PCB, and fill the through hole with a conductive metal to thereby form the conductive vertical via 150. The conductive metal may be formed of a metal such as gold, silver, or copper, but is not limited thereto and may be a conductive metal. In addition, the method of forming the conductive vertical via 150 in the through hole may include filling the through hole with the conductive metal by sputtering, evaporation, or plating, and then planarizing the surface of a substrate, in addition to the method of filling the conductive metal powder.

Subsequently, as shown in FIG. 12B, a molding layer 33 is formed on the molding tape 30 with, for example, an epoxy mold compound (EMC), and the surface is planarized after curing. Subsequently, the upper surface of the cured mold is subjected to chemical mechanical polishing (CMP) treatment to expose the upper end of the conductive vertical via 150, and then the cured mold and the molding frame 31 are separated to obtain the slim mold body 111 illustrated in FIG. 12C.

Subsequently, the wiring layer 120 for inverting the obtained mold body 111, protecting the connection pads 131 and 141 of the exposed encoder and/or decoder 135 and the optical IC 140, and electrically connecting the connection pads 131 and 141 with each other is formed as shown in FIG. 12D.

First, an insulating layer for protecting the connection pads 131 and 141 of the exposed encoder and/or decoder 135 and the optical IC 140 is first formed, and then contact windows for the connection pads 131 and 141 are formed. Subsequently, a conductive metal layer is formed and patterned to form a first wiring pattern 123a interconnecting the connection pads 131 and 141 and a second wiring pattern 123b interconnecting the optical IC 140 and the conductive vertical via 150.

The first and second wiring patterns 123a and 123b are formed by forming a conductive metal layer by a method such as sputtering or evaporation using a conductive metal such as gold, silver, copper, or aluminum.

Thereafter, an insulating layer covering the first and second wiring patterns 123a and 123b is formed.

The insulation layer is made of polyimide, poly (methyl methacrylate) (PMMA), benzocyclobutene (BCB), silicon oxide ($SiO_2$), acrylic, or other polymer-based insulating materials.

Thereafter, in the present invention, as shown in FIG. 12E, the optical fiber alignment guide member 400 and the optical component alignment guide groove 600 are simultaneously formed or independently formed on the wiring layer 120.

When the optical fiber alignment guide member 400 and the optical component alignment guide groove 600 are simultaneously formed, a lower cladding layer is formed on the surface of the wiring layer 120 by using a polymer of a low refractive index, and a core layer is formed by using a polymer of a high refractive index, and a plurality of core patterns are formed at intervals by patterning the lower cladding layer and the core layer.

Subsequently, an upper cladding layer is formed by applying a polymer having a low refractive index to cover the upper portion of the wiring layer 120 while surrounding the plurality of core patterns. Accordingly, an AWG, that is, an optical component 500, in which a plurality of cores 510a-519d are buried, is integrally formed between the lower cladding layer and the upper cladding layer 420.

Thereafter, when the lower and upper cladding layers 420 applied to form the optical component 500 are patterned as shown in FIG. 2A, the optical fiber alignment guide member 400 having the optical fiber insertion channel 410 with the optical fiber 300 assembled in response to the optical component 500 are obtained as shown in FIG. 12F.

Subsequently, when the optical component 500 is mounted on the optical component alignment guide groove 600 on the wiring layer 120, the wiring layer 120 is etched to form the optical component alignment guide groove 600 between the optical devices 130a-130d and the optical fiber alignment guide member 400. In this case, it is possible to form optical device alignment guide grooves 132-132d required to mount the optical devices 130a to 130d.

After forming a window exposed to the outside through the insulating layer from the connection pad 141 of the optical IC 140 to connect the optical IC 140 and the optical device 130, the first and second vertical conductive path members 125a and 125b are formed as shown in FIG. 12G.

In this case, a solder ball or the like required for connection with a connection pad (not illustrated) formed on the lower surface of the optical device 130 may be formed on the surface of the second vertical conductive path member 125b in advance.

Subsequently, a conductive metal is deposited on the upper portion of the exposed conductive vertical via 150 to form a metal layer, and then patterned to form a plurality of conductive strips satisfying one of the data transmission standards to thus form an external connection terminal 160.

The external connection terminal 160 may be variously modified according to the data transmission standard, or may be formed in the form of solder balls or metal bumps.

In the above embodiment, a method of integrating the via PCB 153 into the optical device module 101 by a flip chip process in order to form the conductive vertical via 150 is provided, but it is also possible to form a conductive vertical via 150 after manufacturing the mold body 111.

The optical device module 101 according to an embodiment of the present invention may be packaged in a slim form by packaging the optical IC 140 without using a substrate in a Fan Out Wafer Level Package (FOWLP) manner using a semiconductor manufacturing process.

The connector plug 100 of the present invention is manufactured through a manufacturing process for forming a system-in-package (SIP) type wafer 102 using a semiconductor process on a wafer-by-wafer basis, as shown in FIG. 12D, for subsequently forming the optical fiber alignment guide member 400 for mounting the optical fiber 300, and the optical device alignment guide grooves 132 (that is, 132a-132d) and the optical component alignment guide groove 600 which are necessary for respectively mounting the optical devices 130 (that is, 130a-130d), and the optical component 500 as shown in FIG. 12G, and for forming the vertical conductive path members 125a and 125b required to connect the optical IC 140 and the optical devices 130a to 130d.

Figure 12H:
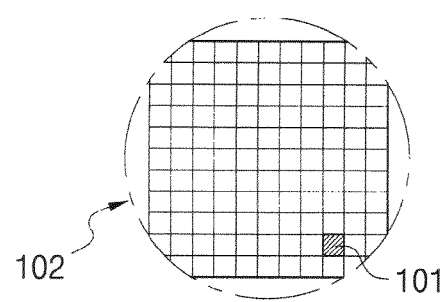

Subsequently, when the optical devices (light emitting or light receiving) 130 are mounted into the optical element alignment guide grooves 132 (that is, 132a-132d) using a solder ball or the like, are connected by the bonding wires 127 between the vertical conductive path member 125a and the connection pads (not illustrated) formed on the upper surfaces of the optical devices 130, and the optical component 500 is mounted into the optical component alignment guide groove 600, to thereby obtain the form of a wafer as shown in FIG. 12H.

Subsequently, an optical engine package, that is, an optical connector plug 100, which can fix a plurality of the optical fibers 300 by a dicing process of sawing and separately separating the wafer 102, is manufactured in a semiconductor package type.

An open optical fiber insertion channel 410 to which the optical fiber 300 is assembled as shown in FIG. 2A is formed on one surface of the optical connector plug 100 obtained as described above.

The connector plug 100 according to the first embodiment of the present invention uses an edge light emitting laser diode, which is integrated on one surface of the optical device module 101 as the optical device 130 and emits light in a lateral direction. In the connector plug 100, the optical devices (light emitting or light receiving) 130 and an optical component 500 for processing an optical signal or changing an optical path are installed into the optical device alignment guide grooves 132 (that is, 132a-132d) and the optical component alignment guide groove 600 formed on one surface of the optical device module (package) 101 having the optical IC 140 for driving the optical devices 130, and The optical fiber 300 is seated on the optical fiber insertion channel 410 formed in the optical fiber alignment guide member 400. As a result, passive alignment of the core lines with respect to the optical devices (light emitting or light receiving) 130, the optical component 500, and the optical fiber 300 may be easily performed.

Moreover, the connector plug 100 of the present invention has high productivity by integrally forming the optical fiber alignment guide member 400 required for assembly of the optical fiber 300, and the optical device alignment guide grooves 132 (that is, 132a-32d) and the optical component alignment guide groove 600 required for assembly/alignment of the optical devices (light emitting or light receiving) 130 and the optical component 500, at a wafer level.

In addition, the optical device module 101 according to an embodiment of the present invention may be manufactured in a slim form of a thickness of 300 µm by packaging the optical IC 140 and the like without using a substrate in a Fan Out Wafer Level Package (FOWLP) manner using a semiconductor manufacturing process. An assembly of the optical component 500 for the optical fiber alignment guide member 400 and the optical component alignment guide groove 600 formed on one surface of the optical device module 101 may be implemented to a thickness of 150 µm. As a result, the overall thickness of the connector plug 100 may be slimly implemented to be less than 0.5 mm.

In the present invention, the assembly of the optical device module 101, the optical fiber 300, and the optical component 500 has a simple structure capable of being coupled through an assembly process of a minimum number of constructional parts.

In the present invention, although the individual optical component 500 is used by integrally forming the optical fiber assembly channel 410 having an open structure on one surface of the optical device module 101 using the optical fiber alignment guide member 400 and then assembling the optical fiber 300 with the optical fiber assembly channel 410, the alignment between the optical device 130 and the optical component 500 and the alignment between the optical component 500 and the optical fiber 300 may have high accuracy without misalignment by using a passive alignment technique.

As a result, the connector plug of the present invention includes the optical fiber assembly channel 410 having an open structure integrally formed in the optical device module 101 in the form of a system-in-package (SIP) type, and thus the optical engines can be packaged into one chip or a single device, and large amounts of data can be transmitted and received at high speed, and can be manufactured at low cost while implementing a small yet slim structure with a thickness of one (1) mm thick.

In the first embodiment of the present invention, the optical device 130, which is composed of four edge light emitting laser diodes, four cores 510, that is, 510a-510d of an arrayed waveguide grating (AWG), and the core 310 of the optical fiber 300 are assembled to the optical device module 101. However, The present invention may be applied to a quad small form-factor pluggable (QSFP), a quad small form-factor pluggable plus (QSFP+), a quad small form-factor pluggable 2B (QSFP2B), and the like as the number of channels is increased.

In a first embodiment of the present invention illustrated in FIGS. 2A to 2C, the optical device 130, the four cores 510, that is, 510a to 510d of the arrayed waveguide grating (AWG), and the core 310 of the optical fiber 300 are formed on a lower side of the optical device module 101. Accordingly, the depth of the optical fiber assembly channel 410 is deeply set so that the core 310 of the optical fiber 300 is located below the optical fiber assembly channel 410 formed in the optical fiber alignment guide member 400.

Figure 3:
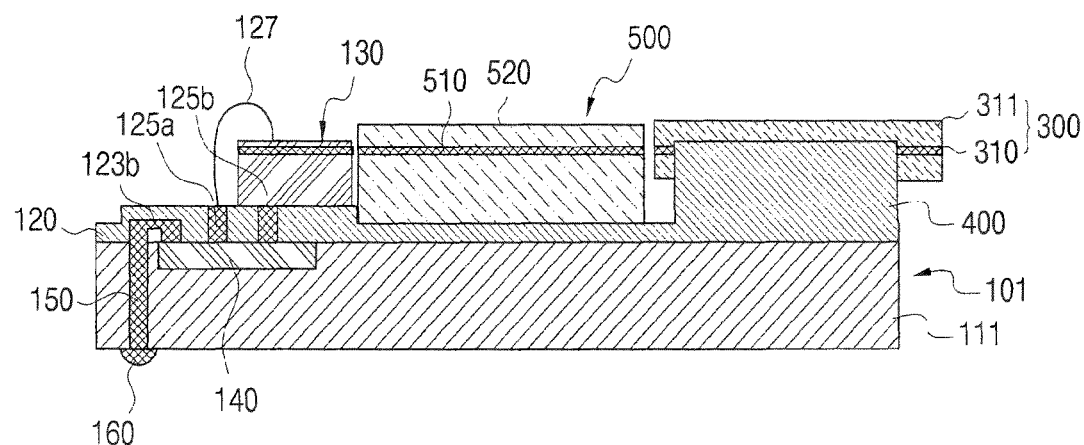
FIG. 3 is a cross-sectional view illustrating a connector plug according to a modified example of the first embodiment of the present invention.

In a connector plug according to a modified example of the first embodiment of the present invention illustrated in FIG. 3, the optical device 130, the four cores 510, that is, 510a to 510d of the arrayed waveguide grating (AWG), and the core 310 of the optical fiber 300 are formed on an upper side of the optical device module 101. Accordingly, there is a difference in that the depth of the optical fiber assembly channel 410 is shallowly set so that the core 310 of the optical fiber 300 is located above the optical fiber assembly channel 410 formed in the optical fiber alignment guide member 400. Since the remaining portion is the same as that as the first embodiment shown in FIGS. 2A to 2C, a detailed description thereof will be omitted.

Figure 4:
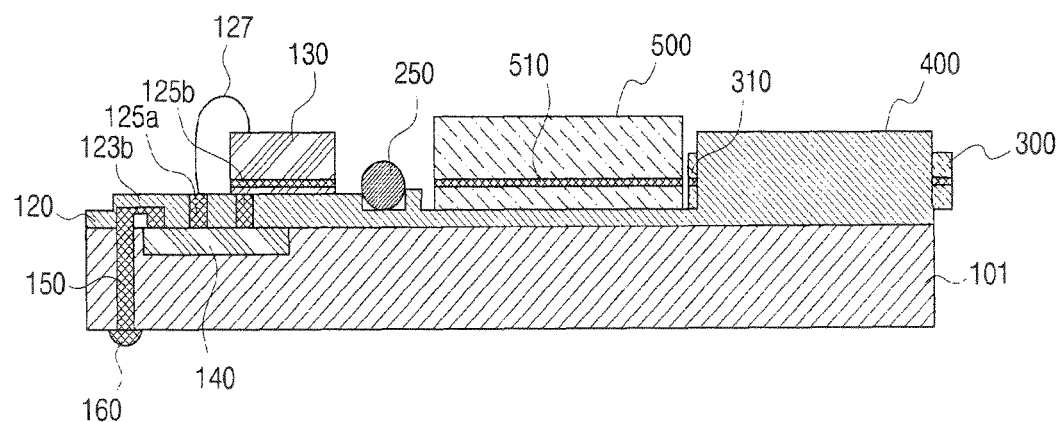
FIG. 4 is a cross-sectional view illustrating a connector plug in which an optical device, an optical component, an AWG, and an optical fiber are mounted on one surface of an optical device module according to a second embodiment of the present invention.

FIG. 4 is a cross-sectional view illustrating a connector plug in which an optical device, an optical component, an AWG, and an optical fiber are mounted on one surface of an optical device module according to a second embodiment of the present invention.

Figure 5A:
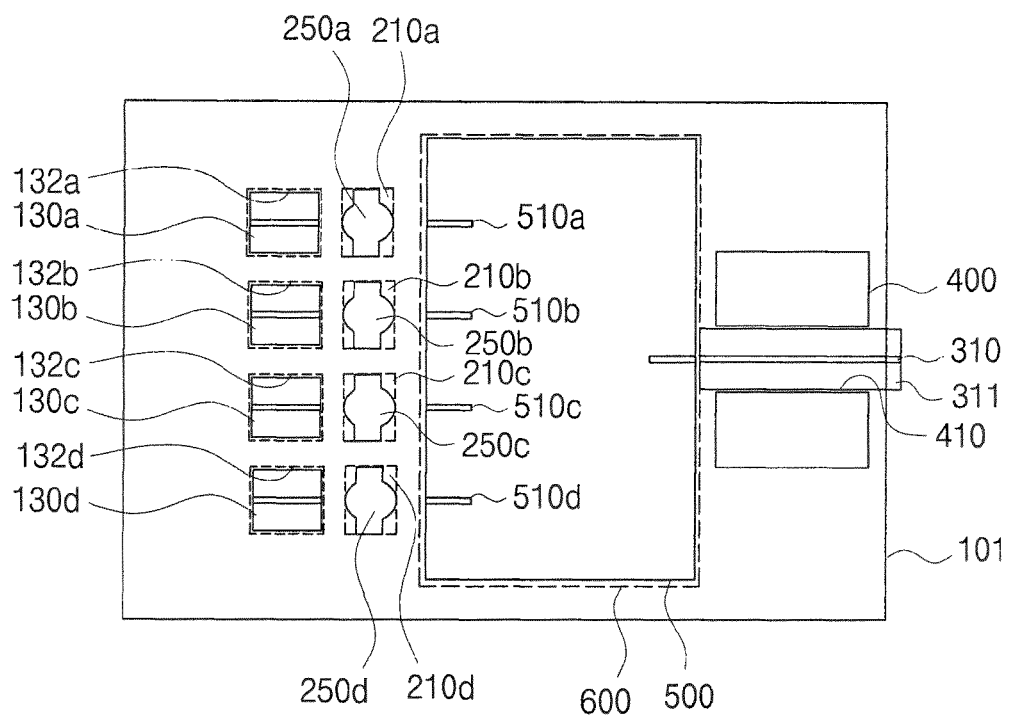
FIGS. 5A through 5C are a plan view, a cross-sectional view, and a side view, respectively, illustrating a connector plug according to a second embodiment of the present invention.
Figure 5B:
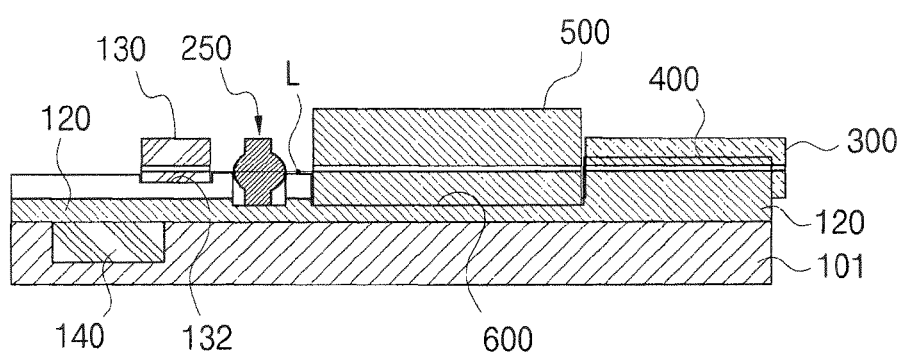
Figure 5C:
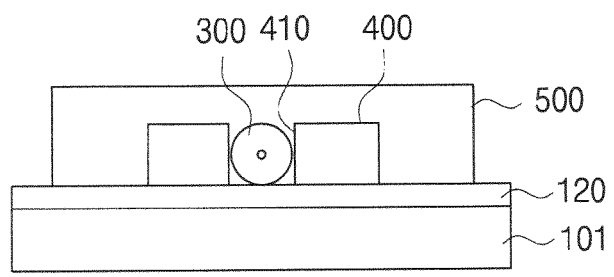

FIGS. 5A through 5C are a plan view, a cross-sectional view, and a side view, respectively, showing a connector plug in which an optical device, an optical component, and an optical fiber are mounted on one surface of an optical device module according to the first embodiment of the present invention.

A connector plug according to a second embodiment of the present invention includes: an optical device module (package) 101 having an optical IC 140 for driving an optical device 130 therein; the optical device (light emission or light reception) provided on one surface of the optical device module 101; an optical component 500 installed on one surface of the optical device module 101 to process a signal generated from the optical device 130 or change an optical path; an optical fiber alignment guide member 400 which is installed on one surface of the optical device module 101 and has an optical fiber insertion channel through which a plurality of optical fibers 300 are mounted; and conductive path members 125a, 125b, and 127 formed on one surface of the optical device module 101 to electrically connect an internal device and the optical device 130.

The connector plug according to the second embodiment of the present invention is different from the first embodiment in that an AWG is used as the optical component 500, and a ball-shaped lens 250 is inserted between the optical device (light emitting or light receiving) 130 and the optical component 500, but the remaining portion of the former are the same as that of the latter.

The ball-shaped lens 250 may be formed simultaneously with the formation of the optical fiber alignment guide member 400 on the surface of the optical device module (package) 101 using a photolithography method.

The ball-shaped lens 250 may be formed in the form of a convex lens or a concave lens to prevent the laser generated from the light emitting optical light device 130 from being dispersed and focus the laser to the cores 510, that is, 510a-510d of the optical component 500.

As shown in FIGS. 5A and 5B, when ball-shaped lenses 250a to 250d are formed in four recesses 210a to 210d formed between the four optical devices 130a to 130d and the four cores 510, that is, 510a to 510d of the AWG, optical lines L may be easily aligned between four optical devices 130a-130d, four lenses 250a-250d, and four inlet-side cores 510, that is, 510a-510d of the arrayed waveguide grating (AWG). In addition, the optical component 500, that is, the outlet-side core of the arrayed waveguide grating (AWG), may be easily passively aligned with the core 310 of the optical fiber 300.

Since the remaining portion of the second embodiment is the same as that as the first embodiment shown in FIGS. 2A to 2C, a detailed description thereof will be omitted.

Figure 6A:
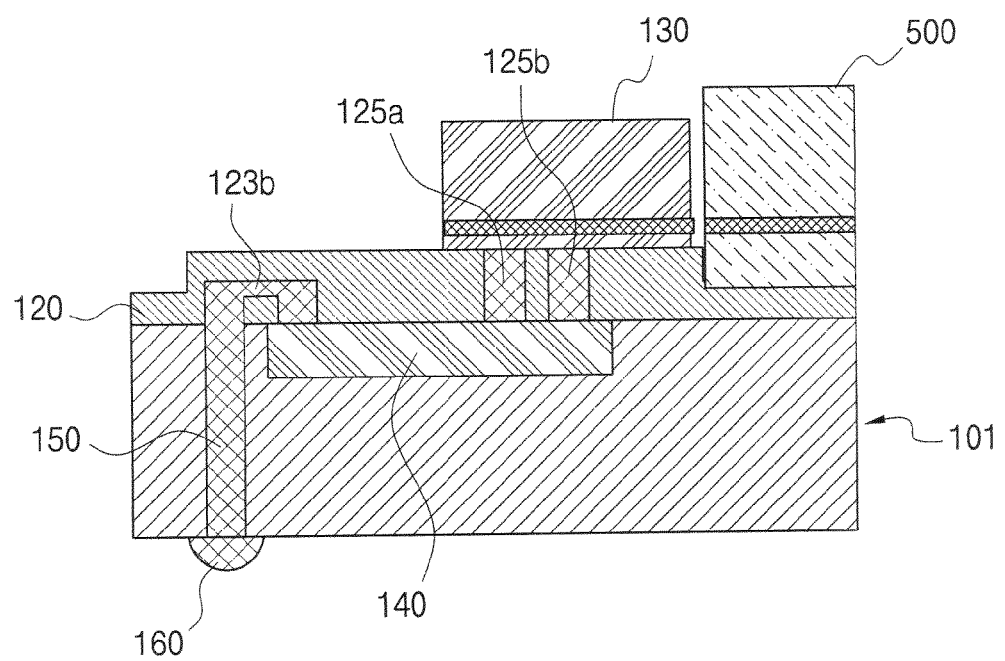
FIG. 6A is a cross-sectional view of a connector plug showing a modified example of a conductive path between an optical device and an optical device module according to an embodiment of the present invention.

FIG. 6A illustrates a connector plug showing a modified example of a conductive path between an optical device and an optical device module according to an embodiment of the present invention.

In the first embodiment, the bonding wire 127 is connected between the vertical conductive path member 125a and the connection pad (not shown) formed on an upper surface of the optical device 130 to connect the optical IC 140 and the optical device 130, and the connection pad (not shown) formed on a lower surface of the optical device 130 is directly connected to the vertical conductive path member 125b using a solder ball or the like.

The connector plug according to a modified example shown in FIG. 6A uses a package chip in which two connection pads made of an anode and a cathode are formed on a lower surface of the optical device 130.

Solder balls or the like are respectively formed in advance on the first and second vertical conductive path members 125a and 125b so that the two connection pads arranged on the lower surface of the optical device 130 are directly connected to the first and second vertical conductive path members 125a and 125b. Using this, the optical device 130 is mounted on the optical device module (package) 101.

Since the remaining portion of the modified example is the same as that as the first embodiment shown in FIGS. 2A to 2C, a detailed description thereof will be omitted.

Figure 6B:
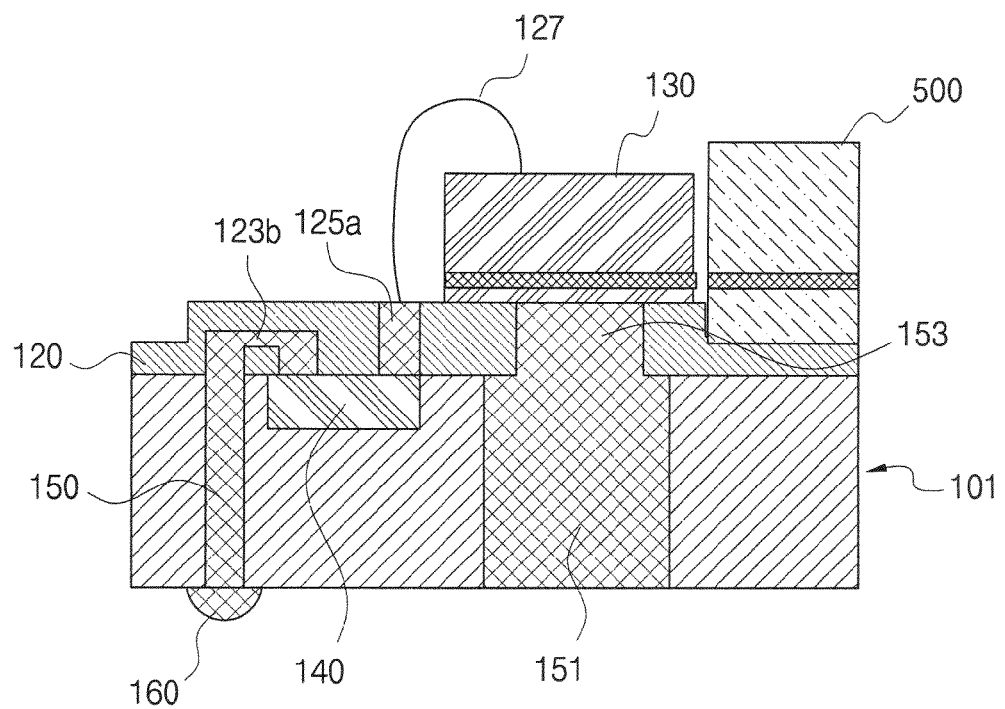
FIGS. 6B and 6C are cross-sectional views of a connector plug showing a modified example of a conductive path having a heat dissipation function between an optical device and an optical device module according to the present invention.
Figure 6C:
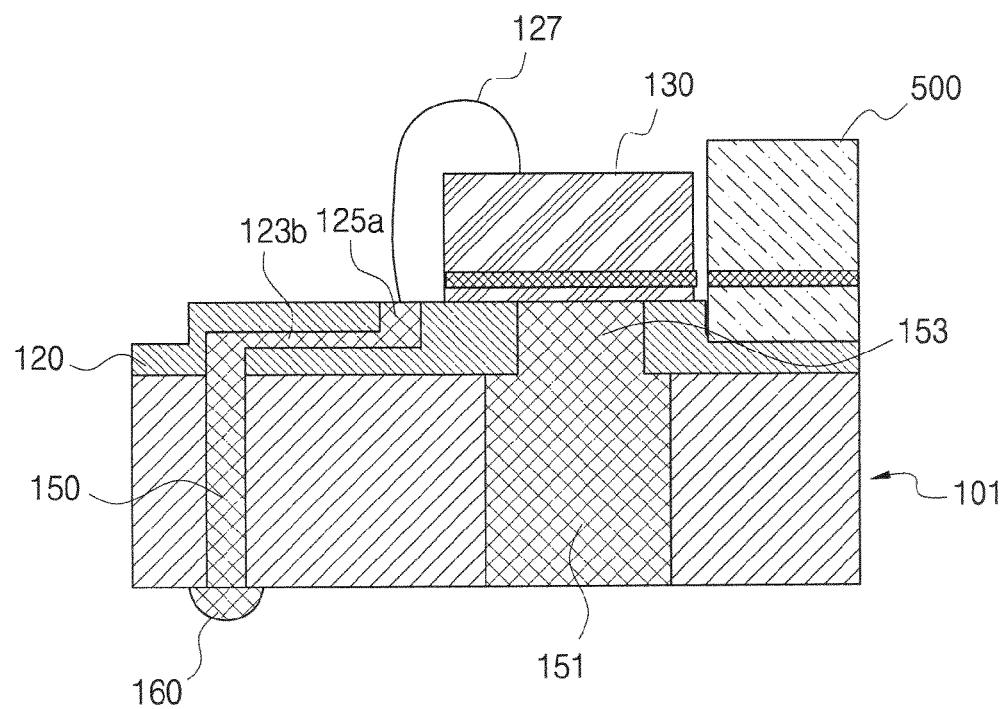

FIGS. 6B and 6C are cross-sectional views of a connector plug showing a modified example of a conductive path having a heat dissipation function between an optical device and an optical device module according to the present invention.

In the first embodiment, the bonding wire 127 is connected between the vertical conductive path member 125a and the connection pad (not shown) formed on an upper surface of the optical device 130 to connect the optical IC 140 and the optical device 130, and the connection pad (not shown) formed on a lower surface of the optical device 130 is directly connected to the vertical conductive path member 125b using a solder ball or the like.

In the connector plug illustrated in FIG. 6B according to a modified example, the bonding wire 127 is connected between the vertical conductive path member 125a and the connection pad (not shown) formed on the upper surface of the optical device 130, and instead of connecting the connection pad (not shown) formed on the lower surface of the optical device 130 to the optical IC 140 through the vertical conductive path member 125b, the connection pad is processed to be exposed to the other side of the optical device module (package) 101 through first and second layer heat dissipation vertical vias 151 and 153.

The first layer heat dissipation vertical via 151 is integrally formed when the optical device module (package) 101 is formed, and the second layer heat dissipation vertical via 153 is formed on the first layer heat dissipation vertical via 151 before the optical device 130 is mounted after the wiring layer 120 has been formed.

The first and second layer heat dissipation vertical vias 151 and 153 may be formed in a manner similar to that of the conductive vertical via 150, and may be implemented in such a manner that a metal having excellent conductivity and thermal conductivity is plated through a through hole or a conductive powder is filled in the through hole.

Since the first and second layer heat dissipation vertical vias 151 and 153 are formed through the optical device module (package) 101, the heat generated from the optical device 130 can be easily emitted to the outside.

The connector plug shown in FIG. 6C according to a modified example is a type in which the optical IC 140 is not embedded in the optical device module (package) 101, the connection pad (not shown) formed on the upper surface of the optical device 130 is connected to the vertical conductive path member 125a, by a bonding wire 127, the vertical conductive path member 125a is connected to the external connection terminal 160 through the conductive vertical via 150, and the connection pad (not shown) formed on the lower surface of the optical device 130 is processed to be exposed to the other side of the optical device module (package) 101 through the first and second layer heat dissipation vertical vias 151 and 153.

Referring to FIGS. 6B and 6C, the connector plug showing a modified example of the illustrated conductive path has a heat dissipation function through the first and second layer heat dissipation vertical vias 151 and 153.

Figure 7:
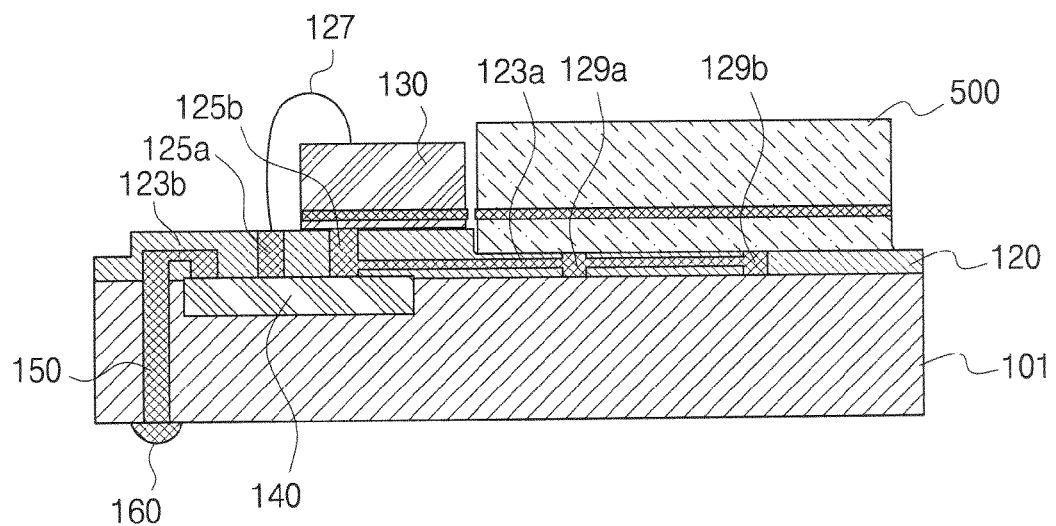
FIG. 7 is a cross-sectional view of a connector plug having a conductive path between an optical component and an optical device module according to an embodiment of the present invention.

FIG. 7 is a cross-sectional view of a connector plug having a modified example of a conductive path between an optical component and an optical device module according to an embodiment of the present invention.

In the first embodiment, the bonding wire 127 is connected between the vertical conductive path member 125a and the connection pad (not shown) formed on an upper surface of the optical device 130 to connect the optical IC 140 and the optical device 130, and the connection pad (not shown) formed on a lower surface of the optical device 130 is directly connected to the vertical conductive path member 125b using a solder ball or the like.

The connector plug shown in FIG. 7 shows a modified example having a conductive path between the optical component 500 and the optical device module 101 by using a wiring pattern 123a extending inside the wiring layer 120 from the vertical conductive path member 125b connected to the optical device 130.

When the optical component 500 is an active optical device, a plurality of connection pads (not shown) may be provided on a lower surface thereof, and electrical connection may be made between the connection pad and the wiring pattern 123a through the vertical conductive path members 129a and 129b.

Figure 8:
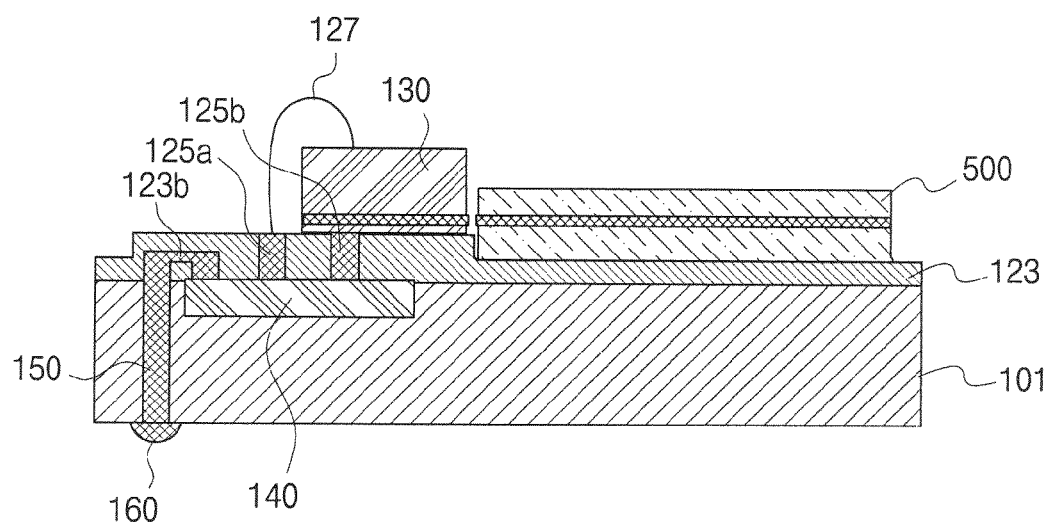
FIG. 8 is a cross-sectional view illustrating a connector plug in which an optical waveguide is integrally formed on one surface of an optical device module according to a third embodiment of the present invention.

FIG. 8 is a cross-sectional view illustrating a connector plug in which an optical waveguide is integrally formed on one surface of an optical device module according to a third embodiment of the present invention.

The optical component 500, that is, an arrayed waveguide grating (AWG), may include a pre-manufactured component assembled to the optical device module 101 or may be integrally formed in the optical device module 101 as shown in FIG. 8.

When the optical fiber alignment guide member 400 is formed, as described above, a lower cladding layer is formed on the surface of the wiring layer 120 by using a polymer of a low refractive index, and a core layer is formed by using a polymer of a high refractive index, and a plurality of core patterns are formed at intervals by patterning the lower cladding layer and the core layer.

Subsequently, an upper cladding layer is formed by applying a polymer having a low refractive index to cover the upper portion of the wiring layer 120 while surrounding the plurality of core patterns. Accordingly, an AWG, that is, an optical component 500, in which a plurality of cores 510a-519d are buried, may be integrally formed between the lower cladding layer and the upper cladding layer 420.

Figure 9:
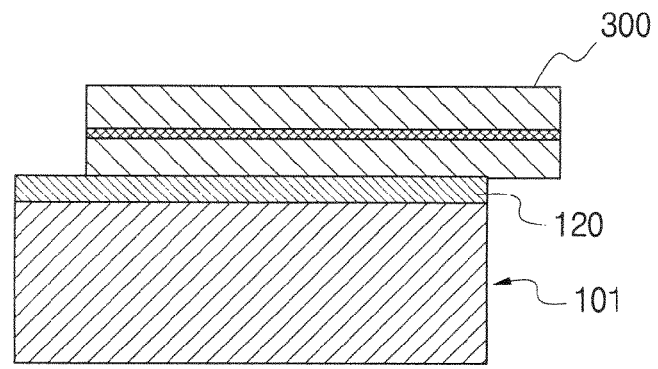
FIG. 9 is a cross-sectional view illustrating a modified example of a connector plug for mounting an optical fiber without forming an optical fiber alignment guide member on one surface of an optical device module according to the present invention.

FIG. 9 is a cross-sectional view illustrating a modified example of a connector plug for mounting an optical fiber without forming an optical fiber alignment guide member on one surface of an optical device module according to the present invention.

In the above-described embodiment, the optical fiber alignment guide member 400 is formed to mount the optical fiber 300. However, as shown in FIG. 9, the optical fiber 300 may be mounted on the wiring layer 120 without forming the optical fiber alignment guide member 400.

Figure 10:
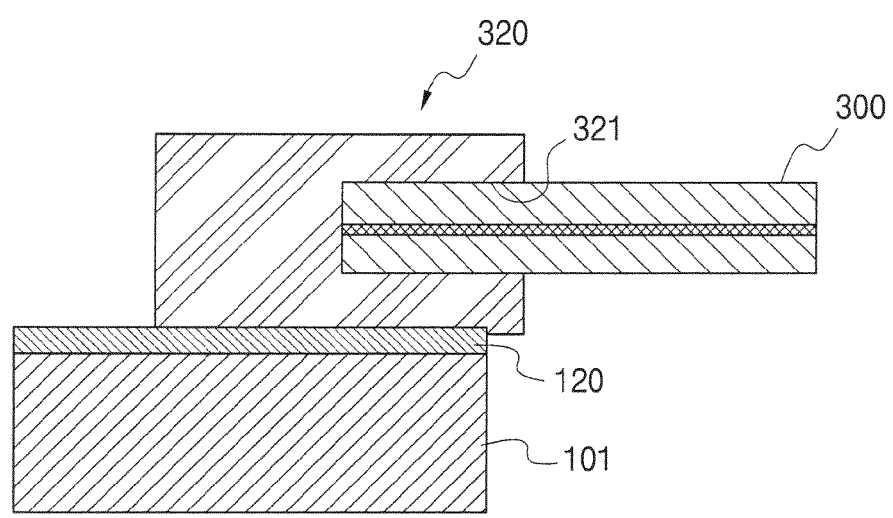
FIG. 10 is a cross-sectional view illustrating a modified example of a connector plug for mounting an optical fiber using an optical fiber mounting block on one surface of an optical device module according to an embodiment of the present invention.

FIG. 10 is a cross-sectional view illustrating a modified example of a connector plug for mounting an optical fiber using an optical fiber mounting block on one surface of an optical device module according to an embodiment of the present invention.

The connector plug according to the present invention can be easily mounted using an optical fiber accommodation block 320 having an optical fiber receiving groove 321 having formed therein when the optical fiber 300 is mounted on one side of the optical device module 101.

That is, when the optical fiber 300 is inserted into the optical fiber receiving groove 321 of the optical fiber mounting block 320, and the optical fiber mounting block 320 is mounted on one surface of the optical device module 101, the optical fiber 300 can be easily mounted.

Figure 11:
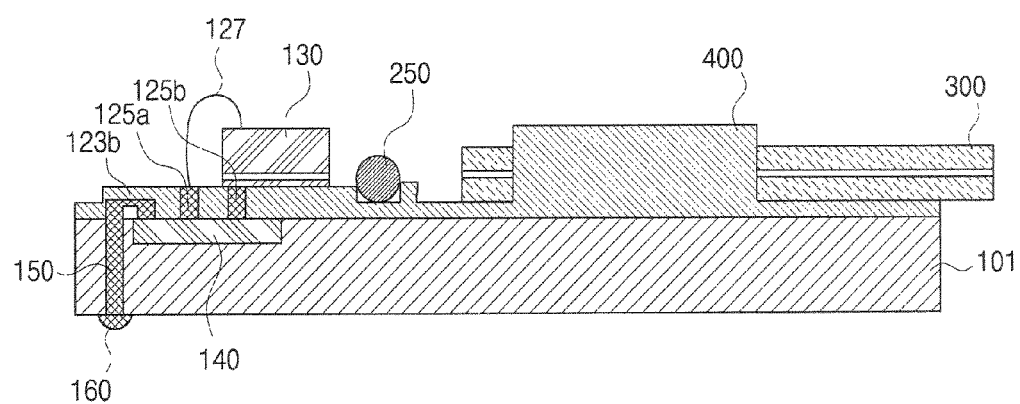
FIG. 11 is a cross-sectional view illustrating a connector plug in which an optical device, a ball type optical component, and an optical fiber are mounted without AWG on one surface of an optical device module according to a fourth embodiment of the present invention.

FIG. 11 is a cross-sectional view illustrating a connector plug in which an optical device, a ball type optical component, and an optical fiber are mounted without AWG on one surface of an optical device module according to a fourth embodiment of the present invention.

The connector plug according to the fourth embodiment includes an optical device 130, a ball type lens 250, an optical component 500 (i.e., AWG), and an optical fiber 300 which are mounted on the optical device module 101.

In the connector plug according to the fourth embodiment of the present invention, the optical device 130, the ball type lens 250, and the optical fiber 300 may be mounted on one surface of the optical device module 101 without the AWG.

Further, an isolator may be installed between the ball type lens 250 and the optical fiber 300 to prevent the laser emitted from the optical device 130 from being reflected and fed back as needed.

In the above description of the embodiment, the first connector plug connected to one end of the optical cable 300a has been described, but a second connector plug connected to the other end of the optical cable 300a may also have the same configuration. However, when the optical element of the optical engine included in the first connector plug uses a laser diode that generates an optical signal, the optical element of the optical engine included in the second connector plug uses a photodiode that receives an optical signal. In this matter, there is a difference between the first connector plug and the second first connector plug.

The connector plug according to an embodiment of the present invention comprises an external connection terminal 160 in the form of a plurality of conductive strips, solder balls, or metal bumps that meet one of the data transmission standards so as to interconnect a terminal with another terminal while forming an active optical cable (AOC).

In addition, the external connection terminal 160 of the connector plug may be variously modified in addition to the data transmission standard.

When the external connection terminal 160 is formed of a plurality of conductive strips, the connector plug 100 according to an embodiment of the present invention can be applied to the case where the connector plug 100 is physically attached to and detached from the mating port 12 of the terminal 10 as shown in FIG. 1.

The case where the external connection terminal 160 is formed in the form of solder balls or metal bumps may be applied to: a board-to-board interconnection between a board (PCB) and another board (PCB), a chip-to-chip interconnection between a chip and another chip, a board-to-chip interconnection between a board and a chip, or an on-board interconnection between a terminal main board and a peripheral I/O device, in one terminal.

In this case, the connector plug 100 is soldered and fixedly coupled to the conductive electrode pads formed on the board using solder balls or metal bumps as one chip instead of physically detachable coupling to the mating port 12.

As described above, the omission of physical mating port-connector plug coupling results in on-board interconnection without going through electrical I/O interfacing or optical interfacing.

As a result, when on-board interconnections are made, the signal path is reduced to a minimum, to thereby reduce signal degradation and jitter, improve signal integrity, reduce data errors caused by parasitic current components in the signal path, and to reduce the overall board development effort, resulting in lower engineering costs.

The connector plug of the present invention may be connected on a board through an on-board interconnection.

An on-board interconnection structure in which a connector plug is mounted directly on a board is the case that an external connection terminal 160 of a connector plug 100 made of solder balls or metal bumps is fixedly coupled to a conductive electrode pad formed on a board 41 constituting, for example, a field programmable gate arrays (FPGA), a DSP, a controller, or the like.

That is, after matching the external connection terminal 160 made of solder balls or metal bumps with the conductive electrode pad formed on a board, the interconnection between the connector plug 100 and the board is made through a reflow process. In this case, the electrode pad of the board coupled to the solder ball of the external connection terminal 160 may be formed of, for example, a ball grid array (BGA), a quad flat non-leaded package (QFN), or the like.

The board may be, for example, a printed circuit board (PCB) used to configure an FPGA, a complex programmable logic device (CPLD), or the like and a plurality of integrated circuit (IC) chips and electronic components may be mounted on the board.

FPGAs are generally applied in functional systems in a variety of fields, including digital signal processors (DSPs), early ASICs, software-defined radios, voice recognition, and machine learning systems. One or two connector plugs 100 may be directly coupled to the board, and may serve to directly connect these the functional systems to other functional boards (systems) or terminals through the optical cable 300a, respectively.

Furthermore, a connector plug 100 or active optical cable (AOC) assembly having an external connection terminal 160 made of solder balls or metal bumps is transponder chip having both an electro-optical conversion function and an opto-electric conversion function. Integrated circuit (IC) chips having a plurality of different functions are integrated into a single package in a system-in-package (SiP) form, various functions are embedded in a single chip, including the connector plug 100 in the form of a system on chip (SOC), or the package may be made in the form of a system on board (SoB) or a package on package (PoP).

An integrated circuit (IC) chip or functional device that may be packaged together in the form of SiP, SoC, SoB or PoP may include: for example, as a processor having a signal processing function, an integrated circuit chip of a central processing unit (CPU), a microprocessor unit (MPU), a micro controller unit (MCU), a digital signal processor (DSP), and an image signal processor (ISP), automotive electronic control units (ECUs) that require a plurality of integrated circuits (ICs) for various multifunction processing, and integrated circuit chips (IC chips) such as autonomous vehicles and artificial intelligence (AI).

The present invention solves a problem that an alignment accuracy is deteriorated when a chip is drifted out of an intended position in a molding process, in the case of using an optical device module in the form of a system-in-package (SIP) type, and may use an edge emitting laser diode in which light is radiated in a lateral direction, not a vertical direction, in an optical device.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention may configure an active optical cable (AOC) assembly using a connector plug capable of easily performing even passive alignment of optical components, and may be applied to an active optical cable (AOC) to be used for large-capacity data transmission between a board and another board, and between an UHDTV-class TV and a peripheral device at a high speed of several tens of giga to 100 giga.

What is claimed is:
1. A connector plug comprising:
an optical device module having an optical engine and a mold body;
a wiring layer formed on one surface of the mold body, the wiring layer being formed of an insulating material and conductive wiring patterns; and
an optical component seated on the wiring layer and for processing an optical signal or changing an optical path,
wherein the optical engine comprises:
two or more optical devices formed on the wiring layer and adjacent to the optical component, each of the two or more optical devices emitting a first optical signal toward the optical component or receives a second optical signal from the optical component, the two or more optical devices comprising: edge emitting laser diodes emitting first optical signals toward the optical component and photodiodes receiving second optical signals from the optical component; and
an optical integrated circuit (IC) installed in the mold body and controlling the two or more optical devices,
wherein the optical component includes an AWG (Arrayed Waveguide Grating), which multiplexes the first optical signals emitted by the two or more optical devices, or demultiplexes a multiplexed optical signal to generate the second optical signals to be received by the two or more optical devices, and
wherein mounting height of the two or more optical devices and the optical component is adjusted so that the first optical signals emitted toward the optical component is matched with a core of the optical component.

2. The connector plug of claim 1, wherein each of the two or more optical devices includes a first connection pad formed on an upper surface thereof, which is connected to a first vertical conductive path member by a bonding wire, and a second connection pad formed on a lower surface of the optical device, which is directly connected to a second vertical conductive path member.

3. The connector plug of claim 1, wherein each of the two or more optical devices includes first and second connection pads formed on lower surface thereof, which are directly connected to first and second vertical conductive path members.

4. The connector plug of claim 1, wherein each of the two or more optical devices includes a first connection pad formed on an upper surface thereof, which is connected to a first vertical conductive path member by a bonding wire, and a second connection pad formed on a lower surface of the optical device, which is exposed to a side surface of the optical device through a heat radiation vertical via.

5. The connector plug of claim 1, wherein the wiring layer further comprises a wiring pattern for withdrawing an output terminal of the optical integrated circuit (IC) to outside,
wherein the wiring pattern is connected to one of the optical component and an external connection terminal formed on the other surface of the mold body.

6. The connector plug of claim 1, wherein the AWG includes:
a core made of a high refractive index material; and
a cladding surrounding the core and made of a low refractive index material,
wherein total internal reflection is performed at an interface between the core and the cladding.

7. The connector plug of claim 1, further comprising: a lens arranged between the two or more optical devices and the optical component to control a path of the first optical signals generated from the two or more optical devices and focus the first optical signals on the core of the optical component.

8. A connector plug comprising:
a mold body and a wiring layer formed on a surface of the mold body, the wiring layer being formed of an insulating material and conductive wiring patterns;
two or more optical devices formed on the wiring layer;
an optical fiber alignment guide member formed on the wiring layer and having an optical fiber insertion channel on which an optical fiber is mounted;
an optical component disposed between the two or more optical devices and the optical fiber alignment guide member, the optical component being seated on an optical component alignment guide groove formed on the wiring layer and adjacent to the optical fiber alignment guide member and the two or more optical devices;
an optical integrated circuit (IC) installed in the mold body and controlling the two or more optical devices; and
a conductive path member formed in the wiring layer to electrically connect the optical integrated circuit (IC) and the two or more optical devices,
wherein each of the two or more optical devices includes: edge emitting laser diodes emitting first optical signals toward the optical component; and photodiodes receiving second optical signals from the optical component,
wherein the optical component includes an Arrayed Waveguide Grating (AWG), which multiplexes the first optical signals emitted by the two or more optical devices, or demultiplexes a multiplexed optical signal to generate the second optical signals to be received by the two or more optical devices, and
wherein mounting height of the two or more optical device and the optical component is adjusted so that the first optical signals emitted toward the optical component is matched with a core of the optical component.

9. An active optical cable (AOC) assembly comprising:
a connector plug according to claim 1 and having an optical fiber insertion channel; and
an optical cable in which at least one optical fiber is coupled to the optical fiber insertion channel.

* * * * *